United States Patent [19]

Villano

[11] E Re. 28,559

[45] Reissued Sept. 30, 1975

[54] METHOD FOR MILLING CAMS FOR SWISS-TYPE SCREW MACHINES

[76] Inventor: John A. Villano, Cam-Apt, 17 Brown St., Waterbury, Conn. 06702

[22] Filed: Oct. 23, 1974

[21] Appl. No.: 517,291

Related U.S. Patent Documents

Reissue of:

[64] Patent No.: 3,831,487
Issued: Aug. 27, 1974
Appl. No.: 315,134
Filed: Dec. 14, 1972

U.S. Applications:

[62] Division of Ser. No. 104,662, Jan. 7, 1971, Pat. No. 3,714,865.

[52] U.S. Cl. ..... 90/11 C; 90/13 C
[51] Int. Cl. ..... B23c 1/18
[58] Field of Search ..... 90/11 C, 13 C, 24.3; 318/573, 605; 235/151.11

[56] References Cited

UNITED STATES PATENTS

| | | | |
|---|---|---|---|
| 2,944,737 | 7/1960 | Cail et al. | 235/151.11 |
| 3,154,674 | 10/1964 | Tyzack et al. | 318/573 |
| 3,248,624 | 4/1966 | Weber, Jr. | 318/605 |
| 3,559,021 | 1/1971 | Bingham, Jr. | 90/13 C |
| 3,609,323 | 9/1971 | McDaniel | 318/573 |

*Primary Examiner*—Gil Seidenfeld
*Attorney, Agent, or Firm*—Mandeville and Schweitzer

[57] ABSTRACT

The invention is directed to a novel apparatus for milling Swiss-type screw machine cams. The invention provides a highly simplified and economical numerically controlled system enabling Swiss-type screw machine cams and similar articles to be milled with an ease and precision heretofore unattainable otherwise than with highly sophisticated and costly equipment. In its most typical application, the invention is utilized in the retro-fitting of an existing *cutting machine, such as a* milling machine apparatus of otherwise conventional construction. Alternatively, the invention can be applied in the first instance, in connection with the manufacture of modified [milling] machines incorporating the new control system.

1 Claim, 4 Drawing Figures

METHOD FOR MILLING CAMS FOR SWISS-TYPE SCREW MACHINES

Matter enclosed in heavy brackets [ ] appears in the original patent but forms no part of this reissue specification; matter printed in italics indicates the additions made by reissue.

---

This is a division of application Ser. No. 104,662, filed Jan. 7, 1971 now U.S. Pat. No. 3,714,865, issued Feb. 6, 1973.

The system of the invention utilizes a conventional three axis *cutting machine, such as a* milling machine, which is fitted out with a rotary table. Numerically controlled stepping motors are provided for the "X" and "Y" axes of the [milling] machine, as well as for the rotary table. An otherwise conventional linear interpolator system, which is substantially self contained and commercially available, is connected between one of the linear axis stepping motors and the rotary table stepping motor. By appropriate control of the continuous and rotary stepping motors through the linear interpolator, precise, continuosu path cutting of involute cam curves is made possible. Such curves are widely utilized in cams for controlling the operation of Swiss-type screw machines, for effecting cutting tool movement at a constant linear speed.

For some Swiss-type screw machines, where the desired cam contour departs slightly from the true involute to accommodate the geometry of the tool supporting arms, the system of the invention provides for programming of the linear and rotary axes to move in the nominal involute relationship, and the "Z" axis of the machine is actuated by a simple mechanical device to introduce the necessary minor geometrical corrections.

The system of the invention provides a highly simplified and economical system for performing a complex [milling] *cutting* operation in the production of precision control cams for Swiss-type screw machines.

BACKGROUND AND PRIOR ART

In the operation of Swiss-type screw machines, it is conventional practice to convert the necessary cutting and shaping operations to a contoured program cam which, as it rotates, controls the movement of one or more tools of the machine. In general, a radial inward cutting movement of a tool would be desirably programmed to proceed at a constant linear speed. To this end, the control cam for many conventional machines would have a surface contour in the form of an involute curve. In certain other conventional makes of Swiss-type screw machines, the orientation of the control cams, and the rocker arms which support the cutting tools, is such that the rocking of the arm will effect a slight repositioning of the cam follower in a circumferential direction, as well as in the desired radial direction. For such machines, the nominal involute curve normally desired is modified or "corrected" slightly to take into account the slight circumferential motion of the cam follower.

Heretofore, the laying out and machining of control cams for Swiss-type screw machines has been a slow and painstaking process, requiring highly skilled machinists. In addition, practical difficulties involved in the machining operation have limited the accuracy to which such cams could be [milled] *cut* on a reasonably economical basis. Even with automatic, numerically controlled (N/C) equipment, it has been difficult and expensive to manufacture these control cams, because the numerically controlled systems available on a suitably economical basis have been limited to point-to-point [milling] *cutting*, resulting in a step-wise cutting action. With such equipment, after the numerical controlled cutting is completed, the cam must be further reworked in order to provide a smooth operating surface, and this tends to introduce inaccuracies, and also requires substantial time to be expended by a skilled machinist.

The need for smoothing out the abrupt transitions of the point-to-point cutting procedure has been long recognized, and efforts have been made to provide equipment capable of effecting a constant slope transition of the cutter from one set of coordinates to the next. The Theodore Weber U.S. Pat. Nos. 3,244,019, 3,248,624 and 3,426,619 are representative of prior attempts to adapt a constant slope control to a numerically controlled milling machine. These prior efforts have, however, been either inordinately complicated and expensive or lacking in performance effectiveness. In the case of the beforementioned Weber patents, for example, constant slope control is afforded by a mechanical variable speed and control, the adjustment of which is effected through the N/C control. However, because of the inherent inaccuracies in the ability to adjust the mechanical variable speed device, it is necessary to provide complicated supplementary control arrangements for making final compensating adjustments in the point-to-point positioning of the cutting tool at the end of each program stage. Since the practical usefulness of any kind of automated equipment involves an evaluation of its installation cost and operating expense in relation to man hours saved, extra cost and unreliability factors mitigate sharply against the commercial usefulness of such equipment. In this respect, up to the present time the industry has virtually dismissed the use of N/C equipment in the production of control cams for Swiss-type screw machines, because of the expense and difficulty of adapting such equipment to the high precision requirements of the cam cutting operation.

SUMMARY OF THE INVENTION

In accordance with the present invention an otherwise generally conventional type of [milling] *cutting* machine apparatus can be adapted or retro-fitted for the effective and economical N/C controlled cutting of Swiss-type screw machine cams through simplified and relatively inexpensive adaptations. Most significant of the adaptations is the utilization of a step motor-driven rotary work supporting table in conjunction with a step motor-driven linear traverse table, with the motors being uniquely interconnected for coordinated action, for the generation of precise involute curves, by a continuous path linear interpolation control system of conventional and commercially available construction. In this respect, the limitations of point-to-point milling, by N/C control of conventional linear traverse milling machines have been long recognized, and equipment has been commercially available for effecting a smooth transition of the cutting path from one coordinate point to another. Thus, there are commercially available, modular control systems, known as continuous path contouring controls, for electronically integrating the "X" and "Y" traverse movements of a milling machine to achieve the desired continuous transition. To this end, the available commercial equipment includes so-called linear interpolation enabling the "X" and "Y" traverse movements to be controlled to cut a straight line along any predetermined angle and there also is equipment which provides for so-called circular interpolation, enabling the "X" and "Y" movements to be coordinated in such a way as to produce a circular cut of predetermined radius. The present invention makes a unique adaptation of the already available equipment by incorporating the available linear interpolation equipment in a circular traverse environment, rather than its intended linear traverse environment, enabling a precision involute curve to be generated, with point-to-point N/C input information. By this means, a conventional type [milling] *cutting* machine may be readily adapted for the cutting of precision Swiss-type screw machine cams.

In accordance with another aspect of the invention, a conn three axis [milling] *cutting* machine is adapted by modification or retro-fitting to have a step motor-driven "X" and "Y" (or "$X_1$" and "$X_2$") axis traverse means, but with a significant reduction (typically 10 to one) introduced in the ratio of motor stepping increment-to-linear traverse increment for one of the axes. This modified apparatus has a two-axis linear interpolator control system which is connected to a rotary table on one side, and is connected through a selector switch to one or the other of the "X" or "Y" (or "$X_1$" or $X_2$") linear traverse controls. In order to effect a rough cutting of the cam profile, the high speed linear traverse may be [be] connected to the machining program, while the other traverse is inactive. For the final, precision cut, the low speed linear traverse is connected to the linear-interpolated control with the rotary table, for making the final cut in precision increments.

To accommodate Swiss-type screw machines in which linear tool movement requires a slight collection of the cam slope profile from the true involute, the invention provides for utilization of the third or "Z" axis of the machine in a unique manner, to effect a corrective motion of the cutting tool as a function of linear traverse of the work. In accordance with the invention, this third axis control is provided using only a two-axis linear interpolator system and without any additional N/C programming, by providing for free motion of the "Z" axis slide of the machine and controlling its movement by way of a pre-formed cam profile carried by the "X" axis table of the machine and operative to effect vertical upward or downward adjustment along the "Z" axis as a function of "X" axis linear movement.

For a better understanding of the invention, reference should be made to the following detailed description and also to the accompanying drawing *showing the invention utilizing a conventional milling machine, although other types of cutting machines may also be used, as will be understood.*

DESCRIPTION OF A PREFERRED EMBODIMENT

Figure 1:
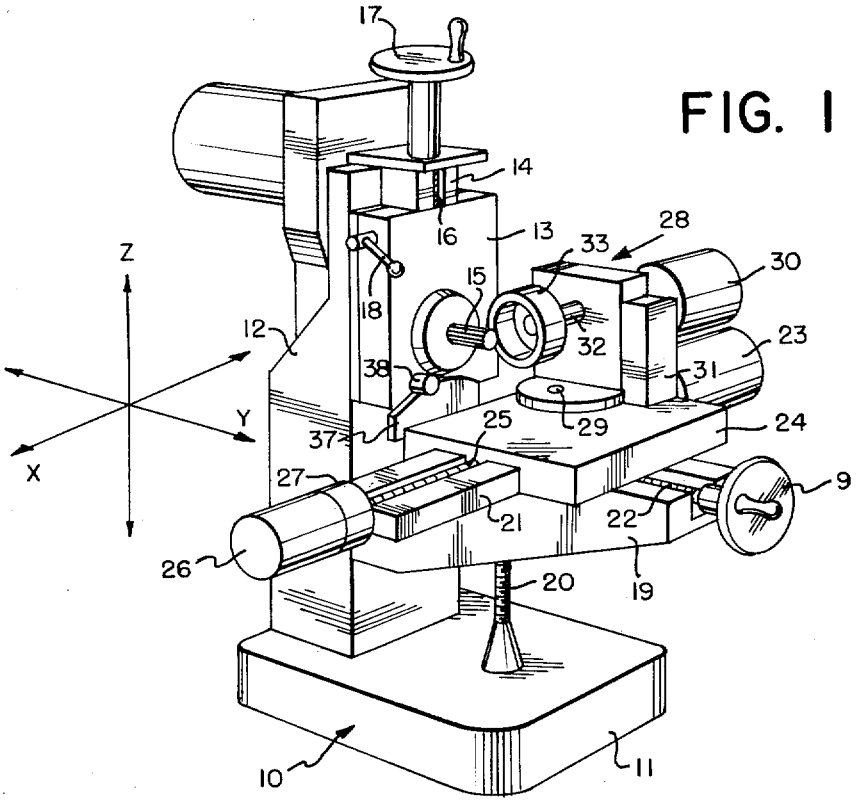
FIG. 1 is a simplified perspective representation of a milling machine incorporating the features of the invention, adapted especially for the milling of control cams for Swiss-type screw machines.
Figure 2:
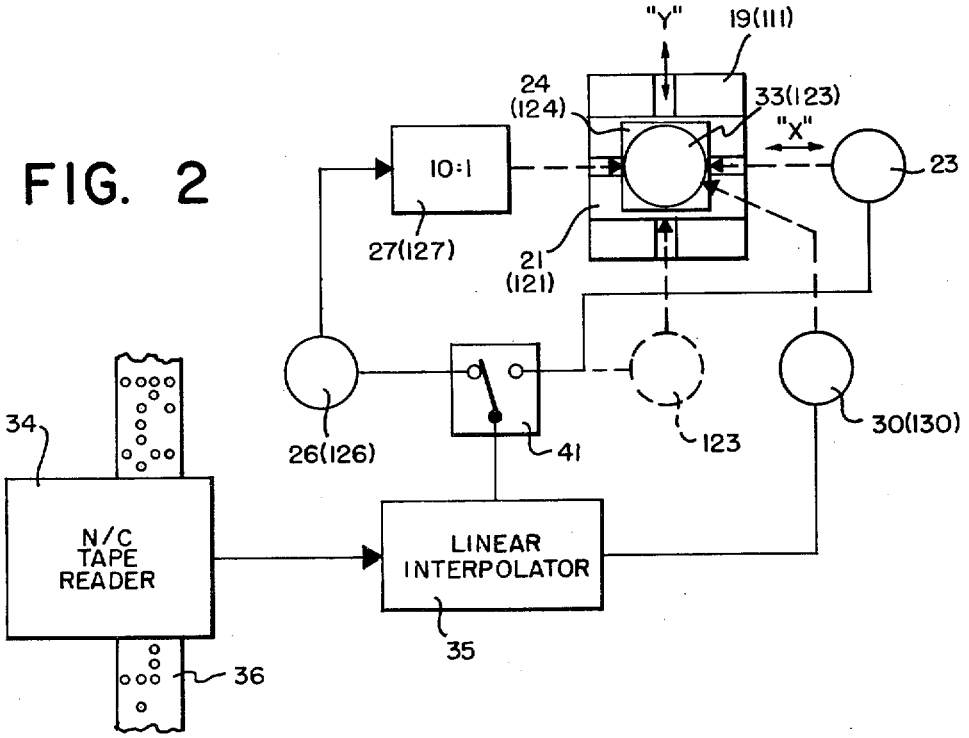
FIG. 2 is a simplified schematic representation of a control system according to the invention, as utilized in the apparatus of FIG. 1.

Referring now to the drawing, and initially to FIGS. 1 and 2 thereof, the reference numeral 10 designates generally a milling machine, which may be of conventional construction, except to the extent the equipment has been modified in its original construction or by retro-fitting to accommodate the new features of the invention. The machine 10 includes a base 11 rigidly supporting a vertical column 12. A slide member 13 is mounted on the column 12, for vertical sliding movement along guideways 14, and carries a suitable power driven cutter 15. The slide 13 is movably connected to the column by means of a threaded shaft 16 which, in the illustrated apparatus, is controlled by a hand wheel 17. By appropriate manipulation of the handwheel 17, the vertical position of the slide 13, relative to the column 12, may be adjustably determined. The threaded shaft 16 is detachably connected to the slide 13, by conventional means (not shown) including a control lever 18. This can be an arrangement with lever 18 rigidly disposed on a rotary shaft extending through slide 13, with a lug on the opposite end of the shaft for engaging flights in screw 16 for holding slide 13 against vertical movement when the lug is in engagement with it.

The milling machine 10 also includes a bed or knee 19 which is slidably positioned on the column 12 and supported thereon in a predetermined position by means of an adjustable support 20. As a generality, the position of the knee 19 is not varied during the course of a machining operation but is capable of adjustment prior to the commencement of machining operations.

A second slide member 21 is supported by the knee 19 and is guided thereon for linear sliding movement in the forward-rearward directions; that is, toward and away from the column 12. The slide 21 is connected to the knee by means of a threaded shaft 22, which may be rotated to advance the slide 21 linearly, toward or away from the column 12 by a hand wheel 9.

A third slide 24 of the milling machine is slidably mounted on the second slide 21 and is adapted for linear movement thereon in the transverse or side-to-side direction. The slide 24 is connected to the slide 21 by means of a threaded shaft 25 driven by selectively useable N/C-controlled stepping motors 26 or 23. Most advantageously, the threaded shaft assembly 25 comprises a precision ball screw unit, in itself well known for the purpose and conventionally available, to provide high precision traverse of the slide 24 in response to rotary movements of the stepping motors 26 or 23. Further, in accordance with one aspect of the invention, a speed reduction gear box 27 is provided between the stepping motor 26 and the ball screw assembly 25 to effect a desired relationship of linear travel of the slide 24 to rotary incremental movements of the stepping motor 26. The arrangement is such that not more than 0.0001 inch of linear slide movement results from a single rotary increment of the stepping motor 26. In a practical machine, this may be achieved utilizing a normal five pitch ball screw assembly 25 and a 10-to-one reduction in the gearbox 27, in conjunction with a commercially available SLOSYN precision stepping motor as manufactured and made available by the Superior Electric Company, Bristol, Connecticut 06010. The stepping motor 23 is connected to the ball screw assembly 25 in a conventional fashion to provide .001 increments of linear movement per rotary stepping increment.

Suitable clutch means (not shown) is provided to selectively engage the stepping motors 26 or 23, so that only one at a time is in operative use. Thus, linear manipulation of the cam blank 33 in the "X" axis direction may be effected by either of the stepping motors 26 or 23, while the rotary axis manipulation of the blank is effected through the rotary table stepping motor 30. This is easily accomplished by setting of the selector switch 41 and the disengagement of either stepping motor 26 or 23. Thus, where it is desired to perform a rough-cut, the machine may be programmed to utilize a relatively high speed system provided by the ratio of stepping motor 23. For precision cutting the slower speed provided by the ratio of stepping motor 26 and gearbox 27 is utilized.

For convenience of reference, the transverse direction of travel followed by the third slide member 24, will be hereinafter referred to as the "X" axis of the machine, while the forward and rearward direction followed by the slide member 21 will be referred to as the "Y" axis, and the vertical direction followed by the first slide member 13 will be referred to as the "Z" axis. In addition, slide movement produced by the motor 26 may be considered as "$X_1$" axis movement, and that produced by the motor 23 as "$X_2$" axis movement.

In accordance with one aspect of the invention, the slide member 24 mounts a rotary table apparatus, generally designated by the numeral 28. The rotary table 28 typically is mounted for variable rotational orientation on the slide member 24, as by means of a vertical pivot 29. In the illustrated arrangement, the pivot 29 is pre-adjusted and set, and is illustrated as being pre-set with the rotational axis of the output shaft 32 of the rotary table 28 disposed in parallel relation to the "X" axis of the machine. By pivoting rotary table 28 on pivot 29 through an arc of 90° to a position where the rotational axis of the output shaft 32 of rotary table 28 is disposed in a perpendicular relation to "X" axis of the machine, a flat cam can also be machined. The rotary table 28 is driven by an N/C controlled stepping motor 30 through a suitable worm gear arrangement 31 to effect a rotary stepping movement of a work supporting output shaft 32. In the illustrated arrangement, the work supporting shaft 32 is illustrated as mounting a cylindrical or bell-type cam blank 33 in position to be machined by the cutting head 15. Desirably, the gear drive relationship between the stepping motor 30 and the work supporting shaft 32 is such that a single rotary increment of the N/C controlled stepping motor 30 will produce not more than 0.01 degrees of rotation of the output shaft 32.

For normal operations of the machine illustrated in FIG. 1, the slide 13 will be so vertically adjusted along the "Z" axis that the axis of the work supporting shaft 32, intersects with the axis of the cutting element 15, and the "Y" axis adjustment of the machine will be such that the side wall of the bell-type cam is aligned with the cutting portion of the cutter. Milling of the cam profile thus is effected by a combination of "X" axis linear movements of the table 24 and related rotary movements of the cam blank 33.

In accordance with the invention, activation of the respective stepping motors 26, 30 or 23, 30 is effected by a suitable N/C tape reading apparatus, generally designated by the numeral 34 in FIG. 2, which may be of conventional design and operation. As a unique feature, however, the N/C control system includes an "X–Y" linear interpolation system 35, which, instead of being connected to respective "X" and "Y" linear axes of the machine, is connected to one linear and one rotary axis — specifically, to the stepping motors 26, and 30 or 23, and 30. The N/C control 34, and linear interpolator 35 are available commercially in a single modular unit. Such an apparatus is sold by the Superior Electric Co. under the identification SLO-SYN Continuous Path Contouring Controls, and a typical such control for two axis operation is the manufacturer's Model No. NCCR25. Such an apparatus is referred to in the Superior Electric Company's Bulletin No. CNC469–1, dated 8/69.

The function of the linear interpolator is to interpolate the beginning and ending coordinates of a linear slope contour and effect coordinated movement of the "X" and "Y" machine axes from the beginning point to the end point, thus producing a continuous contour with a minimum of information supplied by the N/C program tape 36. The apparatus of the invention, however, correlates the "X" axis linear movements of the machine with the rotary movements of the rotary table 28 through the linear interpolator system, and in this way enables a precision involute cam profile to be cut, utilizing the beginning and ending coordinates. This, for the first time, enables the program cams for Swiss-type screw machines to be produced with realistic economies on N/C control equipment. Thus, by uniquely incorporating the linear interpolator system between the linear and rotary axes of the machine, it is not only possible to produce a precision involute profile, which is ideally suited for the production of Swiss-type screw machine cams, but it is also possible to produce these on a continuous path basis, rather than on a point-to-point basis. The point-to-point cutting basis not only requires excessive lengths of program tape 36, to provide the necessary point-to-point information, but it also requires further processing after the automatically controlled cutting operations, in order to smooth out the incremental steps in the profile.

In certain styles of Swiss screw machines, where the cam actuated displacement of the tool supporting arms also result in a circumferential displacement of the cam follower relative to the cam, it is desirable to modify the cam profile slightly from the perfect involute. To accomplish this through the electronic control system would be possible but complex. A stepping motor (not shown) would be substituted for hand wheel 17 to displace the "Z" axis slide 13 through the desired correction by N/C programming, which would require a complex system providing circular interpolation on the "Z" axis with simultaneous linear interpolation between "X" and rotary axes. The invention, however, provides an extremely simplified and inexpensive facility for effecting the necessary corrections to the cam profile. To this end, the "X" axis slide member 24 mounts a modifying or correcting cam 37 (FIG. 1), which engages a cam follower wheel 38, carried by the "Z" axis slide 13. In cases where cam profile corrections are necessary, the "Z" axis slide is released from its threaded control shaft 16 by operation of the lever 18, and the slide descends by gravity until the cam follower 38, rests against and is supported by correcting cam 37. The profile of the cam 37 is calculated to provide a desired degree of vertical movement of the cutting element 15 in relation to "X" axis movements of the slide 24, such that the tangential engagement of cutting element 15 with the circumferential edge of screw machine cam 33 is displaced along the Z axis in the same manner as the screw machine cam 33. The correcting cam 37 is contoured to introduce the necessary correcting "Z" axis movements for a given tool arm of a given make and model of Swiss-type screw machine, and will be a constant function for such tool arm. Thus, on any occasion that a cam blank 33 is being machined for such tool arm, the appropriate correcting cam 37 may be installed.

As will be appreciated, the apparatus of FIG. 1 is uniquely adaptable to the cutting of high precision cam profiles, of either a perfect involute or corrected involute contour, as required by the machine for which the cam is being cut. This unique ability is achieved through the utilization of a conventional, commercially available N/C control with a linear interpolation facility associated with a rotary displacement function, in connection with selectively usable correcting cams operative in the "Z" axis direction of the machine.

Figure 3:
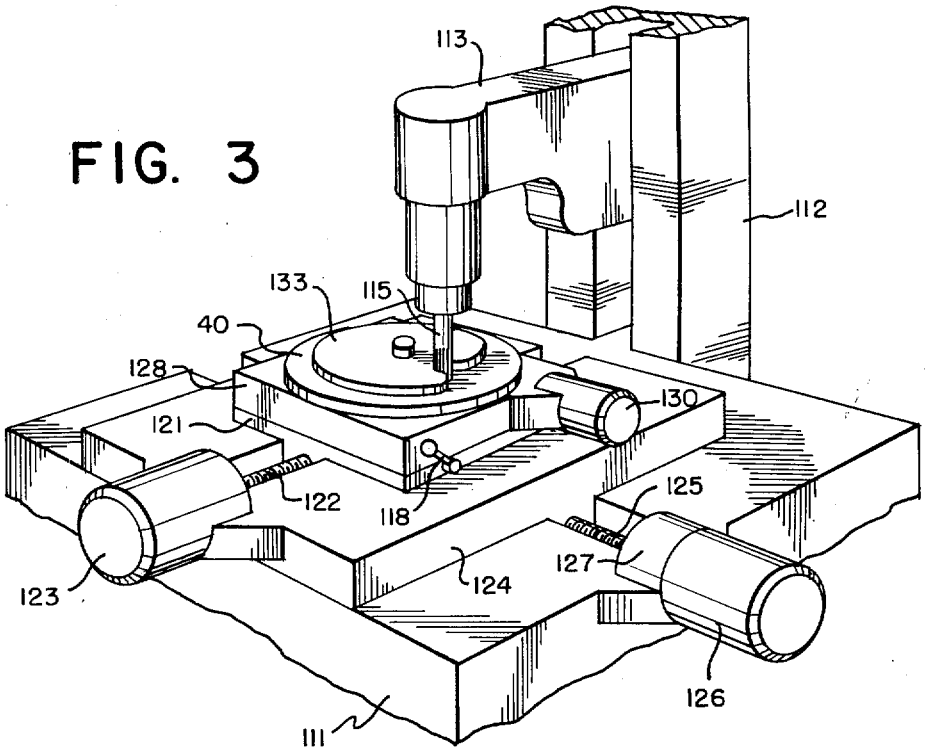
FIG. 3 is a simplified perspective representation of a modified form of milling machine according to the invention.

In FIG. 3, there is illustrated a modification of the apparatus of FIG. 1, in which a rotary table 128 has its work support 40 mounted for rotation about a vertical axis, for cooperation with a cutting element 115, which is also mounted for rotation about a vertical axis. The cutter 115 is carried by a vertically moveable slide member 113 adjustably supported by the machine column 112. In the machine configuration illustrated in FIG. 3, however, the vertical or "Z" axis adjustment of the equipment is not utilized during the normal operations of cutting a cam blank 133.

The rotary table 128 is mounted on a "Y" axis slide member 121, which is in turn mounted on an "X" axis slide member 124. The "X" axis slide is controlled by a threaded shaft 125' driven by an N/C controlled precision stepping motor 126, while the "Y" axis slide 124 is operated by a threaded shaft 122, driven by a similar stepping motor 123.

The control and functioning of the stepping motors 123, 126 of the FIG. 3 apparatus is similar, in general, to that of the similar components of FIG. 1 apparatus. However, for the FIG. 3 apparatus, the N/C tape reader and linear interpolator 34, 35 is connected through the selector switch 41 alternatively to the stepping motor 126 or 123 for the "X" and "Y" axes, rather than the "$X_1$" and $X_2$" axes.

In both of the FIG. 1 and FIG. 3 apparatuses, the "X" axis drive system includes a 10-to-one gear reduction relative to the "Y" and "$X_2$" axis system, by reason of the gearboxes 27, 127. In the FIG. 3 configuration of the apparatus, linear axis manipulation of the cam blank 133 may be effected by either of the stepping motors 123, 126, while the rotary axis manipulation of the blank is effected through the rotary table stepping motor 130. Thus, where it is desired to perform a rough cut, the machine may be programmed to utilize the relatively high speed system of the "Y" axis for the linear axis component. In the FIG. 1 configuration, the high speed "$X_2$" axis motor 23 is utilized. For precision cutting, the slower speed "X" (or"$X_1$") axis system is utilized. As will be readily appreciated, this is easily accomplished by the setting of the selector switch 41, either in the FIG. 1 or FIG. 3 configuration.

Figure 4:
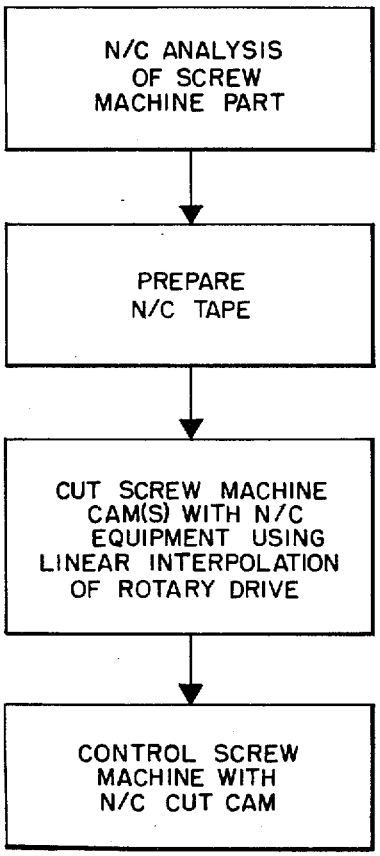
FIG. 4 is a block diagram reflecting a system, utilizing the principles of the invention, for operating a plurality of Swiss-type screw machines on a semi-numerically controlled basis, through the use of a single N/C programmed cam [milling] *cutting* system for an entire group of screw machines.

An advantageous facet of the invention resides in the fact that an entire Swiss screw machine department, consisting of a substantial number of machines, may be operated in effect as if each machine were provided with an individual N/C control. Thus, a single N/C programmed apparatus of the FIG. 1 or FIG. 3 type may be utilized for the production of control cams for an entire series of Swiss-type screw machines. The screw machines themselves are, in effect, N/C controlled through the interposition of the program cams which are themselves in fact produced with N/C control. A typical procedure according to the above is outlined in block diagram in FIG. 4. The first step in the semi-N/C controlled production of a screw machine part is the analysis of the part and the determination of the necessary cam profile, together with the N/C analysis of the cam profile. Special computer programs may be utilized to advantage in this initial N/C analysis. The next step is the actual preparation of the N/C tape 36, and this also may be accomplished by computer control. Step No. 3 is the preparation of the screw machine control cam, utilizing apparatus of the type reflected in FIGS. 1 and 3. In step 4, the thus prepared control cams are installed in the Swiss-type screw machines and a production run of the part may proceed.

The present invention, by incorporating an N/C control with linear interpolator in the linear-to-rotary functions of a [milling] *cutting* machine, rather than in its linear-to-linear functions, for the first time enables a Swiss-type screw machine cam to be produced on an economically feasible basis with N/C programmed equipment. The use of the linear interpolation system in this unique manner enables a true involute curve to be cut in the cam blank utilizing only the beginning and ending coordinates of a slope. It is thus possible to achieve an extremely high level of cam cutting accuracy with a highly simplified form of apparatus. In this respect, while the theoretical possibility of N/C controlled cam cutting for Swiss-type screw machines has long been apparent, the practical difficulties of accomplishing the task with conventional N/C equipment were so formidable that N/C cam cutting has never been realized as a practical reality. However, by utilizing the basic principles of the present invention, the operation is suddenly reduced to requiring only simple machinery and simple controls to achieve a complex end result.

An advantageous subsidiary feature of the invention resides in the ability to utilize a correcting cam profile on one of the idle linear axes of the [milling] equipment. Thus, in the apparatus of FIG. 1, the cam 37 controls the otherwise idle "Z" axis for corrective cutter movement during the cam profiling operations. In the apparatus of FIG. 3, corresponding corrective cam means (not shown) would act between the machine bed 111 and "Y" axis slide 121 to produce a "Y" axis correction as a function of linear movements of the slide 124 in the direction of the "X" axis.

The apparatus of the invention also advantageously may be utilized for both rough cutting and precision cutting, by the provision of a selector switch 41 in conjunction with the "$X_1$" and "$X_2$" axis, or the "X" and "Y" axis stepping motors as shown in FIG. 1 and FIG. 3 and by switching from the lower to the higher ratio stepping motor in FIG. 1. in this respect, it will be understood that in a typical N/C controlled system, the stepping motors have preset maximum stepping rates and thus there is no practical arrangement for driving the motors 26, 126 at a rate high enough to perform rough cutting on an economical basis. In the system of the present invention, an otherwise conventional [milling] machine *such as a milling machine, for example*, is either retro-fitted or modified in the manufacture so that only one ("$X_1$" or "X") of the linear axes includes a high gear reduction between the stepping motor and the associated linear slide. At least one of the other linear axes ("$X_2$" or "Y") may include the standard gear and thread ratios, and this axis then is available for high speed, low precision linear control.

It should be understood, of course, that the specific forms of the invention herein illustrated and described are intended to be representative only, as certain changes may be made therein without departing from the clear teachings of the disclosure. Accordingly, references should be made to the following appended claims in determining the full scope of the invention.

I claim:

1. In a method for mass producing machine parts using a plurality of Swiss-type screw machines being controlled by cams which are formed by a N/C [milling] *cutting* machine, said [milling] machine comprising a [milling] cutter, a work supporting slide having at least one axis of linear movement relative to said cutter, a rotary table mounted on said slide for supporting a cam blank, linear drive means and rotary drive means for moving said slide and said table, respectively, and said drive means being controlled by a N/C system; [N/C system; ] including the steps of analyzing one of said machine parts to determine the profile desired on the cams, preparing a N/C program of linear coordinate information corresponding to the profile desired, supplying said coordinate information to a linear continuous path interpolator, feeding the results from said interpolator to the respective linear and rotary drive means and thereby providing integrated and simultaneous movements of the linear slide and rotary table relative to the [milling] cutter for [forming] *machining* the desired cam, and placing one of said cams into each of said Swiss-type screw machines, whereby one N/C system [effects control over] *is effective for controlling* a plurality of Swiss-type screw machines.

* * * * *